United States Patent
Shi et al.

(10) Patent No.: US 7,917,185 B2
(45) Date of Patent: Mar. 29, 2011

(54) PORTABLE ELECTRONIC DEVICE

(75) Inventors: Zheng Shi, Shenzhen (CN);
Chih-Chiang Chang, Taipei Hsien (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 496 days.

(21) Appl. No.: 12/142,892

(22) Filed: Jun. 20, 2008

(65) Prior Publication Data
US 2009/0233655 A1    Sep. 17, 2009

(30) Foreign Application Priority Data
Mar. 14, 2008   (CN) .......................... 2008 1 0300581

(51) Int. Cl.
*H04M 1/00* (2006.01)
(52) U.S. Cl. ................. 455/575.8; 455/575.1; 455/90.3; 455/347; 455/348; 455/349; 429/96; 429/97; 429/100; 379/433.01; 379/433.08; 379/433.11
(58) Field of Classification Search ............... 455/575.1, 455/575.8, 90.3, 347, 348, 349; 429/96, 429/97, 99, 100; 379/428.01, 428.04, 433.01, 379/433.08, 433.11
See application file for complete search history.

(56) References Cited

U.S. PATENT DOCUMENTS

| | | | | |
|---|---|---|---|---|
| 5,460,906 A * | 10/1995 | Leon et al. | ...................... | 429/97 |
| 5,615,250 A * | 3/1997 | Kobayashi | .................... | 455/558 |
| 5,882,816 A * | 3/1999 | Gotou | .......................... | 429/100 |
| 6,511,770 B2 * | 1/2003 | Chang | .......................... | 429/100 |
| 6,712,643 B2 * | 3/2004 | Suzuki | ......................... | 439/500 |
| 7,123,886 B2 * | 10/2006 | Morita | ......................... | 455/90.3 |
| 7,463,911 B2 * | 12/2008 | Tseng et al. | ............... | 455/575.1 |
| 2004/0202922 A1 * | 10/2004 | Tsai et al. | ....................... | 429/96 |
| 2005/0191970 A1 * | 9/2005 | Hasegawa | ................... | 455/90.3 |

* cited by examiner

*Primary Examiner* — Tuan A Tran
(74) *Attorney, Agent, or Firm* — Steven M. Reiss

(57) ABSTRACT

A portable electronic device (20) comprises a housing (22), a battery (26), a battery cover (28) and a trigger mechanism (24). The housing (22) have a battery chamber (222) defined therein. The battery cover (28) have a mating portion (2822) formed thereon. The battery (268) assembled in the battery chamber (222) with the battery cover (28) covering thereon. and The trigger mechanism (24) comprise an expanding portion (242), a securing portion (244), and a resisting portion (246), the securing portion (244) have two ends respectively connecting the expanding portion (242) and the resisting portion (246), the mating portion (2822) is configured for securely engaging with the securing portion (244) so as to restrain the expanding portion from expanding. The expanding portion (242) is secured within the battery chamber (222). The resisting portion (246) is configured for resisting against the battery (26). When the mating portion (2822) disengages from the securing portion (244), the expanding portion (242) expands and the resisting portion (246) ejects the battery (26) from the battery chamber (222).

16 Claims, 5 Drawing Sheets

PORTABLE ELECTRONIC DEVICE

BACKGROUND

1. Field of the Invention

The present invention relates to portable electronic devices, particularly to a portable electronic device having a battery that can be easily to be attached therewith or detached therefrom.

2. Description of Related Art

Many portable electronic devices, such as mobile phones, are provided with a housing and a battery. The housing has a battery chamber defined therein and two chamber walls formed thereon. The two chamber walls are located opposite to each other. One of the two chamber walls has a battery locking mechanism for locking the battery into the battery chamber. In use, the battery is placed in the battery chamber and attached/locked in battery chamber via the battery locking mechanism. The battery has a projection protruding therefrom. The projection facilitates users to remove the battery from the battery chamber. However, the projection of the battery locking mechanism is typically small-sized, thus increases difficulty for removing the battery from the battery chamber.

Therefore, there is room for improvement within the art.

BRIEF DESCRIPTION OF THE DRAWINGS

Many aspects of the present portable electronic device can be better understood with reference to the following drawings. These drawings are not necessarily drawn to scale, the emphasis instead being placed upon clearly illustrating the principles of the present keypad assembly and portable electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EMBODIMENTS

As required, detailed embodiments of the present invention are disclosed herein conjunction with the accompanying drawings in FIGS. 1 through 5; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the present invention.

Figure 1:
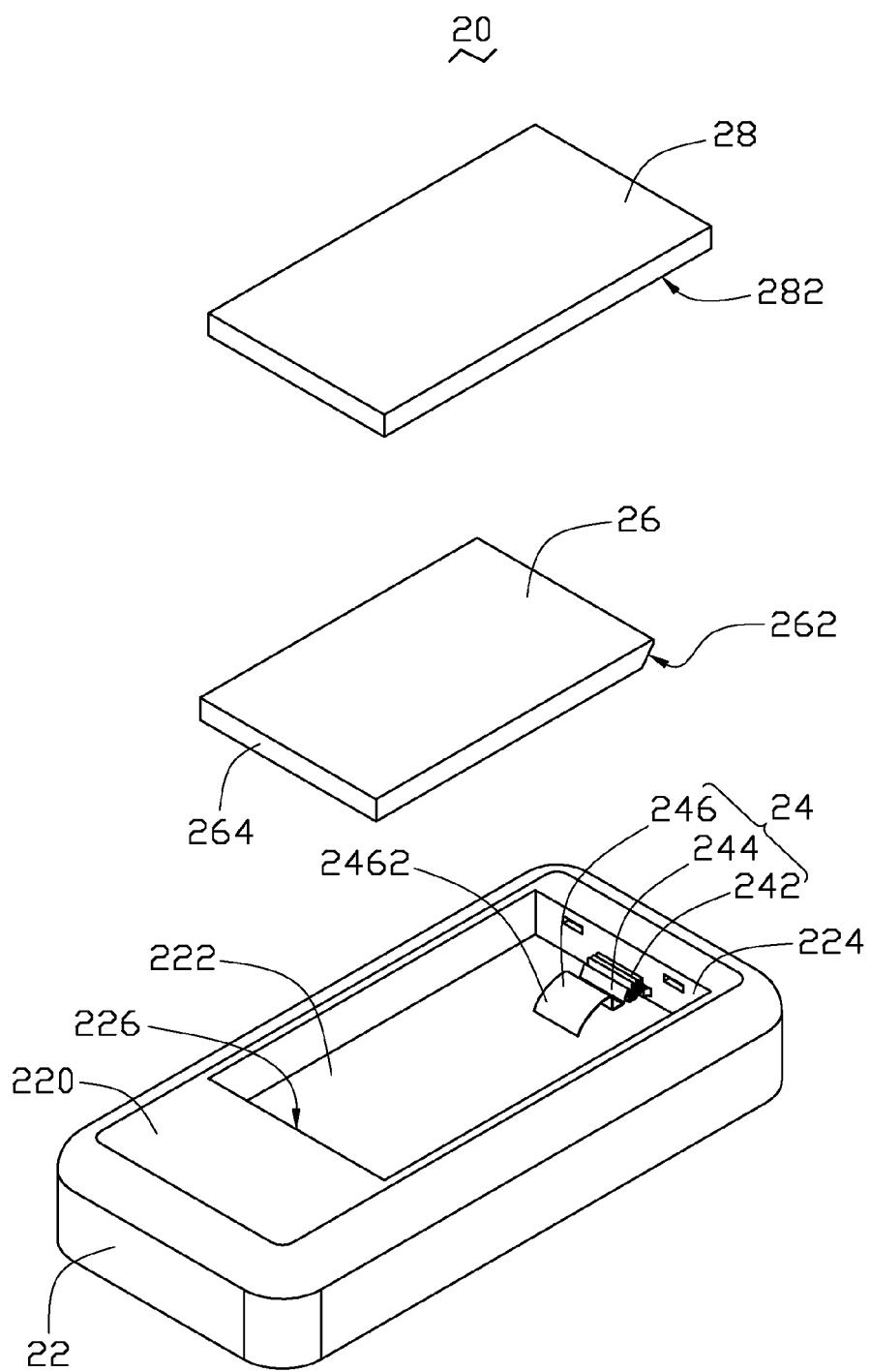
FIG. 1 is an exploded view of a portable electronic device in accordance with a present embodiment.
Figure 2:
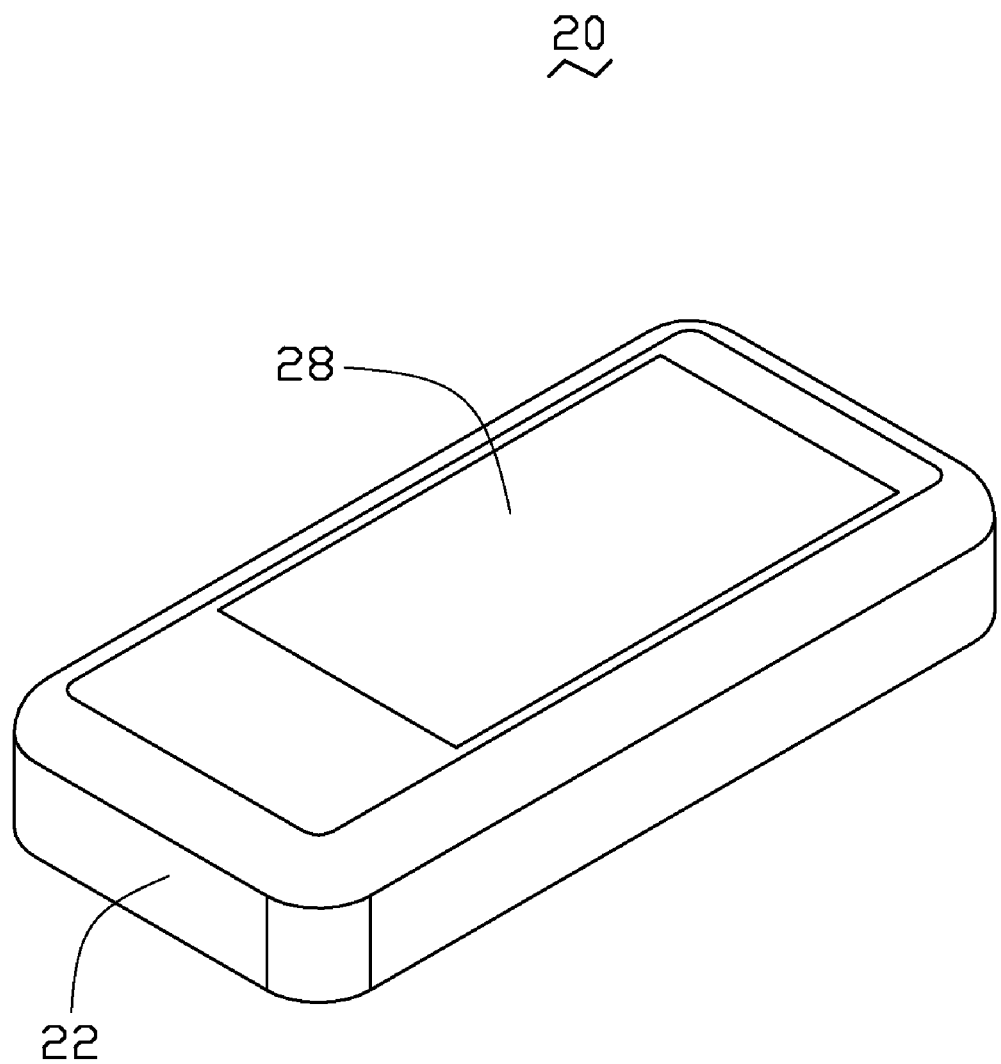
FIG. 2 is an assembled view of the portable electronic device shown in FIG. 1.

Referring to FIGS. 1 and 2, an exemplary portable electronic device in the form of a mobile phone 20 including a housing 22, a trigger mechanism 24, a battery 26, and a battery cover 28.

The housing 22 is rectangular shaped and relatively flat. The housing 22 comprises an outer surface 220, and an inner surface 221 (clearly shown in FIG. 4). The housing 22 has a battery chamber 222 defined therein and exposed through the outside surface 220. A first battery chamber sidewall 224 and a second battery chamber sidewall 226 enclose the battery chamber 222. The first sidewall 224 is located opposite to the second sidewall 226. The battery chamber 222 is configured (i.e., structured/arranged) for accommodating the battery 26 therein.

The trigger mechanism 24 includes an expanding portion 242, a securing portion 244, and a resisting portion 246. The expanding portion 242 and the resisting portion 246 are indirectly coupled by the securing portion 244.

The expanding portion 242 is an elastic member, which may be distorted as an external force exerted thereon and restores to its original state once the external force released. The expanding portion 242 may be a wave-shaped elastic plate. The expanding portion 242 can also be a spring, such as a coil spring. The expanding portion 242 has one end secured to the first sidewall 224 of the housing 22, and the other end connecting with the securing portion 244.

The securing portion 244 is configured for securing the battery cover 28 therewith. The securing portion 244 is substantially U-shaped. The securing portion 244 has one end connecting with the expanding portion 242, and the other end connecting with the resisting portion 246.

The resisting portion 246 has a resisting surface 2462 configured for resisting the battery 26. The resisting portion 246 is a wedge-shaped arched plate.

Figure 3:
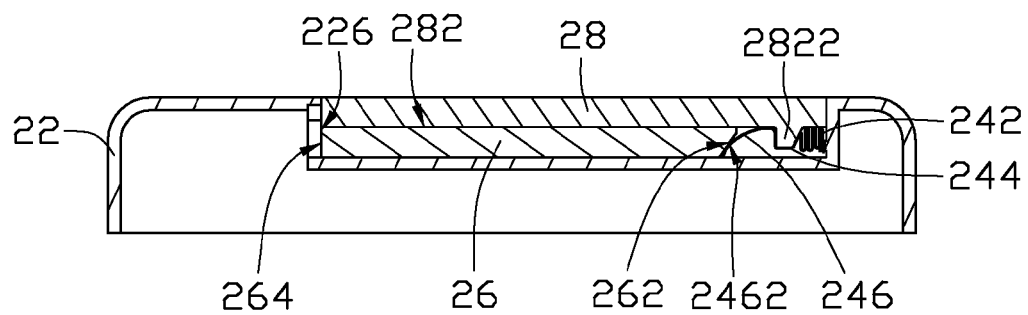
FIG. 3 is a cross sectional view of the portable electronic device in FIGS. 1 and 2, the battery cover being attached with the portable electronic device.

Referring also to FIG. 3, the battery 26 is substantially a planar board in shape. The battery 26 has a first end 262 and a second end 264 opposite to the first end 262. The first end 262 is a wedge wall and may resist the resisting surface 2462 of the resisting portion 246. The second end 264 may resist the second sidewall 226 of the housing 22.

The battery cover 28 is generally rectangular and has a joining surface 282 facing the housing 22. The joining surface 282 has a mating portion 2822 (e.g., a projection) configured for engaging with the securing portion 244.

Figure 4:
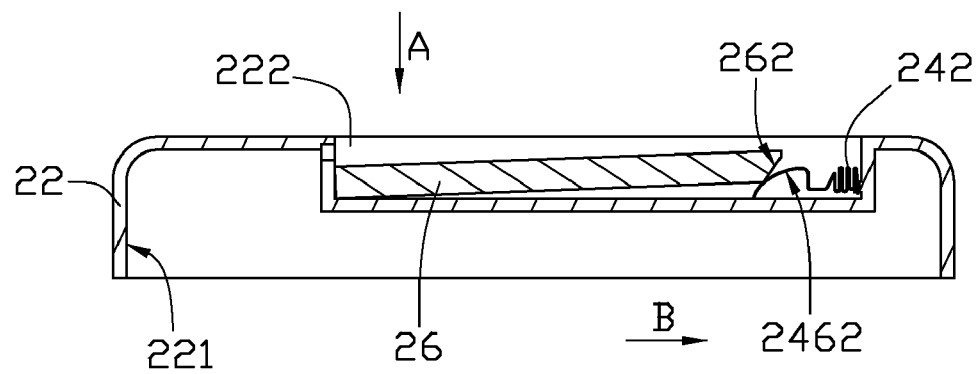
FIG. 4 is a cross sectional view of the portable electronic device in FIG. 3, illustrating the status of the battery being pushed into a battery chamber of the portable electronic device.

Referring further to FIG. 4, during assembly of the battery 26 with the housing 22, the battery 26 is placed into the battery chamber 222 of the housing 22 in the direction of the arrow line A. During this stage, the first end 262 of the battery 26 resists against the resisting surface 2462 of the resisting portion 246. The second end 264 of the battery 26 is forced against the second sidewall 226 of the housing 22. The battery 26 moves in the direction of the arrow line A and the expanding portion 242 simultaneously moves in the direction of the arrow line B. The expanding portion 242 is compressed.

Referring back to FIG. 3, the battery cover 28 is assembled with the housing 22, in which the mating portion 2822 engages with the securing portion 244, and the elastic force of the expanding portion 242 is restrained by the mating portion 2822 and would not further transfer to the resisting portion 246. As a result, the battery 26 is securely assembled with the housing 22.

Figure 5:
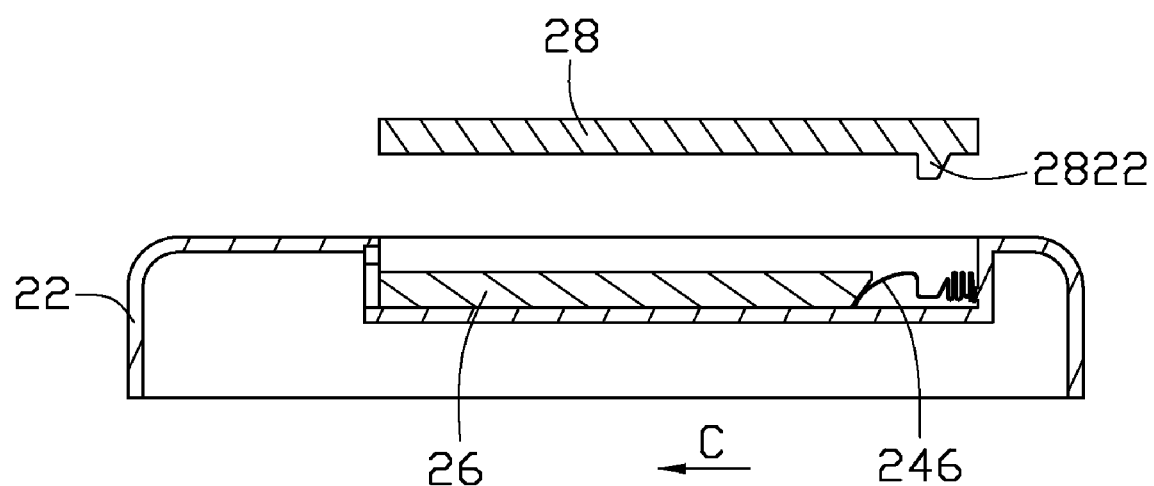
FIG. 5 is a cross sectional view of the portable electronic device shown in FIG. 1-2, the battery cover being detached from the portable electronic device.

Referring further to FIG. 5, during process of removing the battery 26 from the housing 22, the battery cover 28 is removed from the housing 22. The mating portion 2822 becomes disengaged from the securing portion 244, and the elastic force of the expanding portion 242 is transferred to wedge-shaped resisting portion 246. The wedge-shaped resisting portion 246 then moves in the direction of the arrow line C and simultaneously drives the wedge-shaped first end 262 of mover battery 26 upwardly along the resisting portion 246 and from the battery chamber 222. The battery 26 is thereby ejected from the battery chamber 222.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable electronic device, comprising:
   a housing having a battery chamber defined therein;
   a battery cover having a mating portion formed thereon;
   a battery assembled in the battery chamber with the battery cover covering thereon; and
   a trigger mechanism comprising an expanding portion, a securing portion, and a resisting portion, the securing portion having two ends respectively connecting the expanding portion and the resisting portion, the mating portion configured for securely engaging the securing portion to restrain the expanding portion from expanding, the expanding portion being secured within the battery chamber, the resisting portion being configured for resisting against the battery;
   wherein when the mating portion disengages from the securing portion, the expanding portion expands and the resisting portion ejects the battery from the battery chamber.

2. The portable electronic device as claimed in claim 1, wherein the batter has one wedge-shaped end for resisting the resisting portion.

3. The portable electronic device as claimed in claim 1, wherein the resisting portion has a wedge surface resisting to the battery.

4. The portable electronic device as claimed in claim 1, wherein the expanding portion is a elastic member that distorts as an external force is exerted thereon, and restored to its original state once the external force is released.

5. The portable electronic device as claimed in claim 1, wherein the expanding portion is a wavelike elastic plate.

6. The portable electronic device as claimed in claim 1, wherein the securing portion is substantially "U"-shaped.

7. The portable electronic device as claimed in claim 1, wherein the mating portion is a projection.

8. The portable electronic device as claimed in claim 1, wherein the resisting portion is an arched plate.

9. A portable electronic device, comprising:
   a housing having a battery chamber defined therein;
   a battery cover having a mating portion formed thereon;
   a battery assembled in the battery chamber with the battery cover covering thereon; and
   a trigger mechanism comprising an expanding portion, a securing portion, and a resisting portion, the securing portion having two ends respectively connecting the expanding portion and the resisting portion, wherein expansion of the expanding portion securely engages the mating portion to the securing portion;
   wherein when the mating portion disengages from the securing portion, the elastic force stored in the expanding portion being transferred to the resisting portion and the resisting portion ejects the battery from the battery chamber.

10. The portable electronic device as claimed in claim 9, wherein the battery has one end that is wedge-shaped for resisting the resisting portion.

11. The portable electronic device as claimed in claim 9, wherein the resisting portion is wedge-shaped for resisting the battery.

12. The portable electronic device as claimed in claim 9, wherein the expanding portion is a elastic member, which when distorted by an external force exerted thereon, and restored to its original state once the external force is released.

13. The portable electronic device as claimed in claim 9, wherein the expanding portion is a wavelike elastic plate.

14. The portable electronic device as claimed in claim 9, wherein the securing portion is substantially "U"-shaped.

15. The portable electronic device as claimed in claim 9, wherein the mating portion is a projection.

16. The portable electronic device as claimed in claim 9, wherein the resisting portion is an arched plate.

* * * * *